US010863753B2

United States Patent
Diosady et al.

(10) Patent No.: US 10,863,753 B2
(45) Date of Patent: Dec. 15, 2020

(54) IRON-FORTIFIED TEA PREPARATIONS AND METHODS OF MAKING SAME

(71) Applicant: The Governing Council of the University of Toronto, Toronto (CA)

(72) Inventors: Levente László Diosady, Toronto (CA); Veronica Paula Dueik, Santiago (CL)

(73) Assignee: The Governing Council of the University of Toronto, Toronto (CA)

( * ) Notice: Subject to any disclaimer, the term of this patent is extended or adjusted under 35 U.S.C. 154(b) by 207 days.

(21) Appl. No.: 15/764,818

(22) PCT Filed: Sep. 30, 2016

(86) PCT No.: PCT/CA2016/051139
§ 371 (c)(1),
(2) Date: Mar. 29, 2018

(87) PCT Pub. No.: WO2017/054084
PCT Pub. Date: Apr. 6, 2017

(65) Prior Publication Data
US 2018/0279638 A1 Oct. 4, 2018

Related U.S. Application Data

(60) Provisional application No. 62/236,065, filed on Oct. 1, 2015.

(51) Int. Cl.
*A23F 3/14* (2006.01)
*A23L 33/165* (2016.01)
(Continued)

(52) U.S. Cl.
CPC .............. *A23F 3/14* (2013.01); *A23L 29/212* (2016.08); *A23L 29/225* (2016.08);
(Continued)

(58) Field of Classification Search
CPC ........ A23F 3/14; A23L 29/262; A23L 29/212; A23L 29/225; A23L 29/238; A23L 33/16; A23L 33/165; A23P 10/30; A23V 2002/00
See application file for complete search history.

(56) References Cited

U.S. PATENT DOCUMENTS

| 3,458,623 A | 7/1969 | Raymond |
| 3,806,613 A | 4/1974 | Carroll et al. |
| (Continued) | | |

FOREIGN PATENT DOCUMENTS

| CA | 1028192 A | 3/1978 |
| CA | 1032823 A | 6/1978 |
| (Continued) | | |

OTHER PUBLICATIONS

Allen et al., "Guidelines on food fortification with micronutrients", World Health Organization, 2006, Food and Agricultural Organization of the United Nations (376 pages).
(Continued)

*Primary Examiner* — Anthony J Weier
(74) *Attorney, Agent, or Firm* — Klarquist Sparkman, LLP

(57) ABSTRACT

There is provided an iron-fortified tea preparation having dried tea; and a mixture of a chelator and iron adhered to the dried tea, optionally with an adhesive, the molar ratio of chelator:iron in the mixture being about 2:1 or greater. The iron-fortified tea preparation may be used to brew tea, may be mixed with unfortified tea prior to brewing, and may also be used as an additive to food or beverage products.

18 Claims, 9 Drawing Sheets

(51) Int. Cl.

| | | |
|---|---|---|
| *A23P 10/30* | (2016.01) | |
| *A23L 29/225* | (2016.01) | |
| *A23L 29/212* | (2016.01) | |
| *A23L 29/238* | (2016.01) | |
| *A23L 29/262* | (2016.01) | |
| *A23L 33/16* | (2016.01) | |

(52) U.S. Cl.
CPC ........... *A23L 29/238* (2016.08); *A23L 29/262* (2016.08); *A23L 33/16* (2016.08); *A23L 33/165* (2016.08); *A23P 10/30* (2016.08); *A23V 2002/00* (2013.01)

(56) References Cited

U.S. PATENT DOCUMENTS

| | | | |
|---|---|---|---|
| 4,006,263 | A | 2/1977 | Klug et al. |
| 4,931,292 | A | 6/1990 | Torstensson et al. |
| 5,008,120 | A | 4/1991 | Tanaka et al. |
| 5,098,722 | A | 3/1992 | Tanaka et al. |
| 5,378,459 | A | 1/1995 | Grahn et al. |
| 5,534,275 | A | 7/1996 | Humbert et al. |
| 5,670,344 | A | 9/1997 | Mehansho et al. |
| 6,051,261 | A | 4/2000 | Bartholmey et al. |
| 6,344,223 | B1 | 2/2002 | Rekhif et al. |
| 6,461,651 | B1 | 10/2002 | Leusner et al. |
| 6,607,761 | B2 | 8/2003 | Henry et al. |
| 6,994,876 | B1 | 2/2006 | Sher et al. |
| 6,998,143 | B1 | 2/2006 | Sher et al. |
| 7,645,470 | B2 | 1/2010 | Walker et al. |
| 8,795,739 | B2 | 8/2014 | Yang et al. |
| 2003/0059514 | A1* | 3/2003 | Villagran ................ A23J 3/16 426/590 |
| 2005/0053696 | A1 | 3/2005 | Akashe et al. |
| 2006/0078594 | A1 | 4/2006 | Abrahamse et al. |
| 2009/0061068 | A1 | 3/2009 | Marshman et al. |
| 2011/0195147 | A1 | 8/2011 | Drudis Sole |
| 2013/0008215 | A1* | 1/2013 | Morikawa ............. A61K 33/26 71/23 |
| 2014/0061125 | A1 | 3/2014 | Quan et al. |

FOREIGN PATENT DOCUMENTS

| | | |
|---|---|---|
| CA | 1032824 A | 6/1978 |
| CN | 101043824 A | 9/2007 |
| CN | 101755927 A | 6/2010 |
| CN | 101914291 B | 2/2012 |
| CN | 102940037 B | 6/2014 |
| CN | 104188018 A | 12/2014 |
| EP | 1158873 B1 | 1/2004 |
| EP | 0969747 B1 | 6/2009 |
| EP | 1011344 B1 | 7/2010 |
| EP | 2381800 B1 | 3/2015 |
| EP | 2842434 A1 | 3/2015 |
| JP | 2000-279143 A | 10/2000 |
| JP | 2007-215480 A | 8/2007 |
| KR | 10-2004-0048749 A | 6/2004 |
| KR | 10-2004-0051389 A | 6/2004 |
| MX | 2008000928 A | 6/2009 |
| RO | 127713 B1 | 2/2014 |
| RO | 127714 B1 | 2/2014 |
| RO | 127715 B1 | 2/2014 |
| RO | 127717 B1 | 2/2014 |
| WO | 95/22908 A1 | 8/1995 |
| WO | 00/51447 A1 | 9/2000 |
| WO | 03/032741 A1 | 4/2003 |
| WO | 2009/074998 A2 | 6/2009 |
| WO | 2010/116379 A1 | 10/2010 |
| WO | 2014/111532 A1 | 7/2014 |
| WO | 2015/028272 A1 | 3/2015 |
| WO | 2015/028273 A1 | 3/2015 |

OTHER PUBLICATIONS

International Search Report dated Dec. 20, 2016, issued in PCT/CA2016/051139 (3 pages).
Written Opinion dated Dec. 20, 2016, issued in PCT/CA2016/051139 (5 pages).
Cook and Reusser, "Iron fortification: an update", The American Journal of Clinical Nutrition, Oct. 1983, pp. 648 to 659, vol. 38, USA.
Viteri et al., "Fortification of sugar with iron sodium ethylenediaminotetraacetate (FeNaEDTA) improves iron status in semirural Guatemalan populations", The American Journal of Clinical Nutrition, 1995, pp. 1153 to 1163, vol. 61, USA.
Report of a joint FAO/WHO expert consultation Bangkok, Thailand—"Human Vitamin and Mineral Requirements", World Health Organization, 2001 (303 pages).
Champagne and Fustier, "Microencapsulation for the improved delivery of bioactive compounds into foods", Current opinion in biotechnology, 2007, pp. 184 to 190, vol. 18.
Dallman, et al., "Iron deficiency in infancy and childhood", American Journal of Clinical Nutrition, 1980, pp. 86 to 118, vol. 33.
Delarue and Sieffermann, "Sensory Mapping using Flash Profile: Comparison with a Conventional Descriptive Method for the Evaluation of the Flavour of Fruit Dairy Products", Food Quality and Preference, 2004, pp. 383 to 392, vol. 15.
Lynch and Cook, "Interaction of Vitamin C and Iron", Annals of the New York Academy of Sciences, 1980, pp. 32 to 44, vol. 355.
Zhu, et al., "Iron uptake by Caco-2 cells from NaFeEDTA and FeSO4: Effects of ascorbic acid, pH, and a Fe(II) chelating agent", Journal of agricultural and food chemistry, 2006, pp. 7924 to 7928, vol. 54—issue No. 20.
Protest filed on Nov. 14, 2018 in CA App. No. 3.000.665 (6 pages).

* cited by examiner

IRON-FORTIFIED TEA PREPARATIONS AND METHODS OF MAKING SAME

CROSS-REFERENCE TO RELATED APPLICATIONS

This patent application is a U.S. National Stage Application under 35 U.S.C. § 371 of International Application No. PCT/CA2016/051139, filed on Sep. 30, 2016, entitled "IRON-FORTIFIED TEA PREPARATIONS," which claims the benefit of, and priority from, U.S. Provisional Application No. 62/236,065, filed on Oct. 1, 2015, the contents of which are hereby incorporated herein by reference.

FIELD OF THE INVENTION

The present invention relates to iron-fortified tea preparations and methods for producing such preparations.

BACKGROUND OF THE INVENTION

Micronutrient deficiency is a widespread problem both in industrialised and developing nations. Such deficiency often leads to malnutrition, and may arise due to scarce food supply as well as poor food quality or diversity.

In particular, iron deficiency is a major public health concern, due to high prevalence and to association with various diseases and increased mortality. Iron deficiency affects more than 30% of the global population, mostly in the developing world. Iron deficiency is of particular concern in pregnant women and in young children, since rapid growth imposes high need for dietary iron, which need can exceed available levels.

Complications of iron deficiency include anaemia, which can lead to impaired physical and cognitive development in children and reduced productivity and impaired immune systems in adults. Anaemia can also lead to increased maternal and infant mortality, fetal brain damage, premature delivery, and low birth weight.

Fortification of food products is often used as a relatively inexpensive and convenient way to provide missing micronutrients that are not otherwise readily available. Food items often used as fortification vehicles include salt, sugar and rice, as these items are staples in many or most diets. Tea is widely consumed in many cultures, including in South Asia, and thus is also a potentially useful vehicle for fortification.

SUMMARY OF THE INVENTION

This invention relates to methods of fortifying tea with iron to provide a fortified tea product that may be an inexpensive source of bioavailable dietary iron. As well, the invention relates to iron-fortified tea beverages in which iron is bioavailable.

Due to the nature of added iron, fortification of food with an iron source faces particular challenges. The added iron needs to be bioavailable, without making the fortified food unpalatable. Iron fortification is often associated with undesirable flavour and colour changes in the food due to reaction of components of the food with the iron. Such organoleptic changes can be off-putting for the person consuming the iron-fortified product, thus undermining the iron fortification efforts due to decreased consumption of the fortified food.

For the iron-fortified preparation as described herein, tea is selected as the food vehicle to deliver iron in iron-deficient diets. As the second most highly consumed beverage in the world (second only to water), tea is a beverage that is enjoyed worldwide including in developing countries, and can be relatively inexpensive and easily prepared. Tea is often consumed on a daily basis and thus can be used to provide an appropriate serving of added iron to a person's daily diet.

Tea contains various phenolic compounds, including polyphenol flavonoids that may provide many health benefits associated with tea. However, the polyphenols in tea, which include tannins, can readily interact with trace metals such as iron, complexing the iron and thus reducing the bioavailability of both the added iron and the tea polyphenols. Thus, the presence of these polyphenols adds a further challenge to providing an iron-fortified food product using tea as the food vehicle: ideally, the tea polyphenols and iron are both bioavailable without causing significant organoleptic changes in the food product due to the added iron.

To address the issue of reduced bioavailability of iron when added to tea, and the resulting reduction in bioavailable polyphenols, the present invention uses competitive chelation to counteract the complexing effects of the polyphenols in the tea on the added iron. That is, a chelator that coordinates and thus chelates the iron is mixed with the iron, with the chelator present in molar excess over the amount of iron. The chelator/iron mixture is then adhered to the dried tea. The inventors have found that about one additional molar equivalent or greater of chelator over the added iron is required to prevent reduction in iron and polyphenol bioavailability due to complexation of the iron with tea polyphenols, and to help reduce organoleptic changes due to the iron reacting with the brewed tea.

Thus, the present invention includes a chelator with the iron, in a molar ratio of about 2:1 chelator:iron or greater. The addition of about one molar excess or more of chelator over the total added iron content thus competes with the polyphenols in the tea, complexing with the iron, allowing the iron to be bioavailable in the prepared tea beverage.

Thus, as described herein, the iron-fortified tea preparation comprises dried tea having an adhered chelator/iron mixture, with the chelator:iron molar ratio in the mixture being about 2:1 or greater.

As well, as described herein, tea beverages may be prepared with a chelator/iron mixture having a chelator:iron molar ratio in the mixture of about 2:1 or greater.

In one aspect, the present invention provides an iron-fortified tea preparation comprising: dried tea; and a mixture of a chelator and iron adhered to the dried tea, the molar ratio of chelator:iron in the mixture being about 2:1 or greater.

The chelator may have a molecular weight of 1000 daltons or less, and may be, for example, EDTA or EDDHA, or a combination thereof. In some embodiments, the chelator is EDTA.

The mixture of the chelator and iron may be adhered to the dried tea with an adhesive.

The adhesive may comprise a starch, a modified starch, a dextrin, a modified dextrin, a cellulose, a modified cellulose, sucrose, a stearin or a gum. The adhesive may comprise hydroxypropylmethylcellulose, hydroxypropyl carboxymethyl cellulose or a modified dextrin.

The mixture of the chelator and the iron may be microencapsulated, including for example in a reverse enteric coat, an enzyme-responsive coat, a delayed release coat, or in a thermally-stable enteric coat. The mixture of the chelator and the iron may be microencapsulated in chitosan, pectin, cylcodextrin, dextran, guar gum, inulin, amylose or locust bean gum. In some embodiments, the mixture of the chelator and the iron is microencapsulated in chitosan.

The amount of iron present in the tea preparation may be from about 0.1 mg iron per g of dried tea to about 20 mg iron per g of dried tea.

The mixture may further comprise additional components, including for example a flavouring, a colouring, a perfume, or an essential oil. The mixture may further comprise ascorbic acid.

In another aspect, there is provided a mixed tea preparation comprising the iron-fortified tea preparation of the invention mixed with untreated dried tea having no mixture of a chelator and iron adhered thereto, the iron-fortified tea preparation and the untreated dried tea mixed in a ratio of from about 1:1 to about 1:20 of iron-fortified tea preparation:untreated dried tea.

In another aspect, there is provided a method of preparing an iron-fortified tea preparation, the method comprising: combining a chelator with an iron source in a molar ratio of about 2:1 or greater of chelator:iron to form a mixture of chelator and iron; adding an adhesive to the mixture of the chelator and the iron; and adhering the mixture of the chelator and the iron to dried tea to yield the iron-fortified tea preparation.

The method may be designed to yield the various embodiments of the fortified tea preparation as described herein.

In the method, the chelator may be dissolved in a solvent and the iron source may be subsequently mixed in.

The adhesive may be added at a concentration of about 0.5% (w/v) to about 25% (w/v).

The mixture of the chelator and the iron may be microencapsulated in a microencapsulating agent prior to adding the adhesive.

The iron-fortified tea preparation may be dried following the adhering step.

In another aspect, there is provided an iron-fortified tea beverage comprising a chelator/iron mixture having a chelator:iron molar ratio in the mixture of about 2:1 or greater.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The figures, which illustrate, by way of example only, embodiments of the present invention, are as follows.

DETAILED DESCRIPTION

Figure 1:
FIG. 1 is photographs of tea prepared without (left) and with (right) ferric EDTA, demonstrating the dark coloured complex formation between the tea polyphenols and the iron.

Briefly, the compositions, products, methods, and uses described herein relate to iron-fortified tea. The iron-fortified tea preparation as described herein comprises dried tea with an adhered mixture comprising a chelator and iron, the molar ratio of chelator:iron in the mixture being about 2:1 or greater. The mixture of chelator and iron is adhered to the tea leaves, optionally using an adhesive. Optionally, the chelator:iron mixture may be microencapsulated prior to adhesion to the dried tea, optionally with the adhesive.

Thus, there is provided an iron-fortified tea preparation, which can be used to prepare a tea beverage or used as an ingredient in a food product.

The tea used in the tea preparation is any tea that is suitable for preparing a brewed tea beverage or suitable for other consumption, such as inclusion as an ingredient in another food product. Thus, the tea may be in a dried form, and may comprise buds and/or leaves of the plant *Camellia sinensis*, including the *sinensis* or *assamica* varieties. The dried tea may be, for example, a wilted, unwilted, bruised, oxidized, partially oxidized, fermented or partially fermented dried tea bud or leaf, including white tea, green tea, yellow tea, pu-erh tea, oolong tea or black tea. The tea may comprise buds and/or leaves, including whole leaves or crushed leaves, including in powdered or granular form.

A mixture comprising a chelator and iron from an iron source is adhered to the tea, optionally using an adhesive.

As will be understood, a chelator (also referred to as a chelating agent) is a molecule (also referred to as a ligand) that is able to form two or more coordinate bonds with a metal atom (i.e. the ligand is multidentate), thus complexing with the metal to form a chelate.

Thus, the chelator used in the mixture may be any multidentate ligand that can complex with an iron atom to form a chelate. The chelator may be a small molecular weight ligand. Small molecular weight refers to a molecule having a molecular weight molecule of typically 1000 daltons or less, or in some embodiments 900 daltons or less, or 500 daltons or less. The chelator may be a non-polymeric compound, meaning it is not composed of multiple monomeric subunits linked together. The chelator used in the mixture may be a combination of two or more different chelators.

The chelator may be for example, ethylene diamine tetraacetic acid (EDTA), or may be ethylenediamine-N,N'-bis(2-hydroxyphenylacetic acid) (EDDHA), or a combination thereof.

The iron used may be from any bioavailable iron source that contains an iron atom or iron ion that is available for coordination with the chelator to form a chelate. For example, the iron source may be chelated iron such as ferric sodium EDTA, or a bioavailable ferric or ferrous salt, and the iron source may be water soluble or water insoluble prior to complexing with the chelator. The iron source used in the mixture may be a combination of two or more different iron sources.

For example, the iron source may be ferrous sulphate, ferrous gluconate, ferrous lactate, ferrous fumarate, ferrous citrate, ferrous succinate, ferric pyrophosphate, ferric orthophosphate, or iron EDTA (e.g. ferric EDTA or ferric sodium EDTA), or any combination thereof.

For non-chelated iron sources, water solubility of the iron source tends to correlate with bioavailability of the iron. However, increased water solubility of an iron source also tends to be associated with colour and flavour changes (i.e. organoleptic changes) of any food vehicle containing the iron source. Thus, although water soluble forms of added iron may be more readily absorbed upon consumption of a fortified food product, the resulting changes to the food may make the fortified food product unpalatable. In contrast, water insoluble or poorly soluble iron sources provide low iron bioavailability without added chelator.

In the described iron-fortified tea preparation, the iron source is mixed with excess chelator in order to improve bioavailability of the iron source while preventing or reducing complexing between the iron and the tea polyphenols. As indicated above, the tea polyphenols are desirable as they provide many of the benefits of tea. However, complexing of the tea polyphenols with iron render both the polyphenols and the iron as non-bioavailable. The chelate formed between the chelator and the iron is bioavailable, and may also be soluble at the pH in the intestine.

Thus, in the mixture, the chelator should form a chelate with most or all of the iron from the iron source, with about one molar equivalent or more of excess chelator present in the mixture that is not part of the chelate.

The mixture of chelator and iron contains about one molar equivalent or more excess chelator as compared to iron. Without being limited by theory, the excess chelator may act as a competitor of polyphenols in the tea. Thus, should any iron atom be released from the chelate, additional chelator is available to re-bind the iron atom and potentially prevent the iron from complexing with the tea polyphenols. The chelator may have a higher binding affinity for the iron as compared to that of the tea polyphenols.

The mixture thus contains about 2 moles or more of chelator for every mole of iron atoms or iron ions in the mixture.

As described herein, the about 2:1 molar ratio or greater of chelator:iron is in reference to total moles of chelator and total moles of iron in the mixture once mixed.

Thus, for example, if the iron source used is iron EDTA, the iron EDTA contains a 1:1 molar ratio of iron and EDTA, and thus about one additional molar equivalent or more of EDTA should be included in the mixture in order to have a final ratio of about 2 moles or more of EDTA for every mole of iron.

If, for example, the iron source used is ferrous sulphate and the chelator used is EDTA, about one molar equivalent of ferrous sulphate will be added to the mixture for every two molar equivalents or more of EDTA in order to obtain the final molar ratio of about 2:1 or greater chelator:iron.

About one excess molar equivalent or more of chelator over the molar equivalent of iron appears to increase the bioavailability of the iron upon consumption of tea beverage brewed from the iron-fortified tea preparation. That is, with a molar ratio of about 2:1 or greater chelator:iron, the iron appears to be equally bioavailable when the mixture is added to water or prepared with brewed tea. At a molar ratio of less than 2:1 chelator:iron, iron bioavailability appears to be reduced when prepared with tea as compared to water, likely due to complexation of the iron with the tea polyphenols.

Ratios of about 2:1 or greater chelator:iron may be used in the mixture. For example, the chelator:iron ratio may be about 2:1 or greater than 2:1, about 2.1:1 or greater than 2.1:1, about 2.2:1 or greater than 2.2:1, about 2.3:1 or greater than 2.3:1, about 2.4:1 or greater than 2.4:1, about 2.5:1 or greater than 2.5:1, about 2.6:1 or greater than 2.6:1, about 2.7:1 or greater than 2.7:1, about 2.8:1 or greater than 2.8:1, about 2.9:1 or greater than 2.9:1, or about 3:1 or greater than 3:1.

The mixture may optionally further comprise other components in addition to the chelator and the iron.

For example, other components that increase iron absorption or bioavailability may be included in the mixture. One such component may be ascorbic acid, which is known to enhance iron absorption. Inclusion of ascorbic acid in the mixture may incrementally improve absorption of the iron, particularly in cases where the iron source has low bioavailability, such as ferric pyrophosphate. Without being limited by theory, the effect of ascorbic acid for enhancing iron bioavailability in fortified tea may be due to the pH lowering effect of ascorbic acid. At low pH, complexes between the tea polyphenols and iron are not formed; however, once the tea reaches the intestine, such complexes tend to form rapidly in the absence of the competitive chelator in an about 2:1 molar ratio of chelator:iron. The presence of the ascorbic acid in the mixture may supplement the competitive chelation effect of the about one molar equivalent or more of excess chelator over iron.

Other components that may also be optionally included in the mixture include components that may be used to modify the taste or colour of a tea beverage brewed with the iron-fortified tea preparation, including a tea beverage that is to be prepared with or without added milk. For example, a flavouring, colouring, perfume, essential oil or other additive may be included in the mixture.

As described above, the excess chelator included in the mixture may compete with the polyphenols in the tea for complexation of the iron, and thus provides increased bioavailability of the added iron in the iron-fortified tea preparation. The chelator may also help to reduce colour or flavour changes in the tea due to reactions of tea components with the added iron. For example, iron added to tea can result in formation of a dark bluish colour, and depending on the iron source, may produce off-flavours in the tea. However, tea beverage brewed using the iron-fortified tea preparation may have minimal or no colour or flavour changes.

However, to further decrease the likelihood of organoleptic changes in the tea, the mixture may optionally be microencapsulated in a microencapsulating agent, which may be any agent used to form a microencapsulating coating typically used in pharmaceutical applications and which releases the capsules contents into the tea or into the mouth, stomach or intestine of the person consuming the tea. For example, the microencapsulating agent may form a delayed release coating or may form a reverse enteric coating.

The microencapsulating agent may be any fat or polymer that can fully coat particles of the mixture and protect them from interacting with the polyphenols in the tea, including in the brewed tea. Thus, the microencapsulating agent should be water insoluble or sparingly soluble, including in hot or boiling water, and should withstand the temperature of the hot or boiled water used to make the tea beverage.

The microencapsulating agent should be non-toxic and safe for human ingestion. Microencapsulation technologies are known in the art, including reverse enteric coat microencapsulation, enzyme-responsive coat microencapsulation, delayed release coat microencapsulation and thermally-stable enteric coat microencapsulation.

For example, the microencapsulating agent may be a polymer.

In some embodiments, the microencapsulating agent may be a reverse enteric coat polymer, which remains intact at pHs above 5, for example the pH of brewed tea, and which disintegrates at lower pHs, such as that of stomach acid. Such a polymer may be, for example, chitosan.

The microencapsulating agent may be an enzyme-responsive coat polymer, which polymer is insoluble and stable in aqueous solution, but is degraded by specific enzymes present in the digestive tract. Such a polymer may be, for example, pectin, cylcodextrin, dextran, guar gum, inulin, amylose or locust bean gum.

The microencapsulating agent may be a thermally-stable enteric coat polymer, which polymer is stable at temperatures and pHs of brewed tea and stomach, but which disintegrates at higher pHs close to neutral or above neutral, such as found in the small intestine.

Thus, if desired, the chelator/iron mixture may be included in an appropriate microcapsule when adhered to the dried tea.

The mixture of chelator and iron, optionally microencapsulated, is adhered to the dried tea, in order to evenly distribute the mixture over the dried tea and to prevent settling of the mixture in the dried tea when packaged or sold in bulk.

If the chelator:iron mixture components are soluble in a food grade solvent including an aqueous solvent, including any additional components that may be added, the mixture may be adhered to the dried tea by dissolving the mixture in the solvent and spraying the resulting solution containing the mixture onto the dried tea. The sprayed solution containing the mixture may then be allowed to dry on the dried tea, thus adhering the mixture to the dried tea.

If the mixture is microencapsulated, the microcapsules may also be adhered by spraying a suspension of the microcapsules onto the dried tea, or by spraying the solution containing the mixture and the microencapsulating agent onto the dried tea.

The mixture may also be advantageously adhered to the dried tea with an adhesive. As described above for the microencapsulating agent, it will be appreciated that the adhesive should be non-toxic and safe for human ingestion. The adhesive may be water soluble and may dissolve in a brewed tea beverage, or may release the chelator/iron mixture, or the microcapsules containing the chelator/iron mixture, from the tea during brewing, for example by melting in the brewed tea. For example, depending on the type of tea and the conditions available for brewing, the adhesive may dissolve or melt in brewed tea at a temperature of 60° C. or higher.

The adhesive may be any suitable compound or composition that adheres the chelator/iron mixture, or the microcapsules containing chelator/iron mixture, to the dried tea. The adhesive may be a polymer, for example a starch, a modified starch, a cellulose, a modified cellulose, a dextrin, a modified dextrin, or may be another suitable substance such as sucrose, a stearine or a gum. In some embodiments, the adhesive may be hydroxymethylpropylcellulose, hydroxypropyl carboxymethyl cellulose or a modified dextrin. For example, hydroxymethylpropylcellulose, hydroxypropyl carboxymethyl cellulose or a modified dextrin at concentrations of from about 0.5% (w/v) to about 2.5% (w/v) may be used as an adhesive.

The amount of the mixture adhered to the tea may vary. For example, the mixture may be adhered at a concentration designed to deliver from about 0.1 mg iron to about 20 mg iron per serving of brewed tea, from about 1 mg iron to about 10 mg iron per serving of brewed tea, or from about 2 mg iron to about 5 mg iron per serving of brewed tea. It will be appreciated that the amount of iron delivered by a serving of brewed tea using the iron-fortified tea preparation will vary depending on how much dried tea is used to prepare the brewed tea, which will vary depending on the type of tea, how the tea is packaged (i.e. loose, powdered or granular versus in a tea bag) and individual taste. For example, for some teas, about 1 gram to about 5 grams of dried tea may be used to prepare a serving of brewed tea. In some embodiments, consumption of two servings of tea per day brewed using the iron-fortified tea preparation, may provide from about 2 mg to about 10 mg of iron per day.

In some embodiments, the mixture may be adhered to the tea at a concentration that provides from about 0.1 mg iron/g dried tea to about 20 mg iron/g dried tea, or from about 0.5 mg iron/g dried tea to about 10 mg iron/g dried tea.

Thus, the iron-fortified tea preparation as described herein thus can be used to brew a tea beverage, and thus can readily provide iron supplementation to a person's diet, including on a daily basis. Due to the competitive chelation with an excess of at least one molar equivalent of chelator over the iron, complexing of the iron by the tea polyphenols is reduced or prevented, resulting in bioavailable iron. The inclusion of the added iron to the tea via the chelator/iron mixture with the about 2:1 or greater molar ratio of chelator:iron may result in minimal organoleptic changes of the brewed tea, with the resulting tea beverage having similar colour and taste to the same dried tea without the adhered chelator/iron mixture.

The iron-fortified tea preparation may be readily and inexpensively prepared.

The chelator is combined with the iron source at a ratio of about 2 or more moles of chelator for each mole of iron in the iron source, in order to form the chelator/iron mixture. The method of combining may vary, depending on the particular chelator and iron source used.

The chelator and iron mixture may be formed, for example, by mixing the chelator and the iron source together in solution, using an about 2:1 or greater molar ratio of chelator:iron.

As indicated above, the iron source may be a soluble or insoluble iron source. In some embodiments, the iron source may comprise ferrous sulphate, ferrous gluconate, ferrous lactate, ferrous fumarate, ferrous citrate, ferrous succinate, ferric pyrophosphate, ferric orthophosphate, or iron EDTA (also referred to as ferric EDTA).

In some embodiments, the chelator may be dissolved in a solvent in which the chelator is soluble and the iron source may be added to the chelator solution. The chelator in the solution should bind the iron in the iron source, thus forming a chelate with about one molar equivalent or more of excess chelator in the solution.

Once formed, the chelator/iron mixture may be microencapsulated if desired, using techniques known in the art, using a suitable microencapsulating agent as described above.

A solution containing the microencapsulating agent may be used to coat the chelator/iron mixture, to form capsules in the micrometer scale of coated chelator/iron mixture. Microencapsulation techniques may include, for example, pan coating, air-suspension coating, centrifugal extrusion coating, vibrational nozzle encapsulation, or spray-drying methods.

For example, a solution or suspension of the chelator/iron mixture and the microencapsulating agent may be used as a liquid medium to form the microcapsules by spray drying.

In some embodiments, sodium ferric EDTA is used as the iron source, and each mole of sodium ferric EDTA is mixed with an additional mole of EDTA in water. About 10 to about 50% dextrin (by weight of the chelator/iron mixture) is added to the solution, and the solution is spray dried to form the microcapsules.

The chelator/iron mixture, or the optional microcapsules containing the chelator/iron mixture, is then adhered to the dried tea, for example using known methods such as spray coating, or dip coating.

The chelator/iron mixture, optionally in the form of microcapsules, may be combined with the adhesive in liquid or suspension form for application to the dried tea, if the adhesive is to be used.

For example, the adhesive may be added to a solution comprising the chelator/iron mixture, or a suspension comprising the microcapsules, to form a chelator/iron/adhesive mixture for application to the dried tea. The chelator/iron/adhesive mixture may then, for example, be sprayed onto the dried tea and allowed to dry, thus adhering the chelator/iron mixture to the dried tea.

The concentration of the adhesive in the chelator/iron/adhesive mixture should be sufficient to adhere the chelator/iron mixture to the dried tea upon drying of the chelator/iron/adhesive mixture. The concentration will depend in part on the particular adhesive used, as well as the amount of chelator/iron mixture used. For example, the adhesive may be used at a concentration of from about 0.5% (w/v) to about 25% (w/v) in the chelator/iron/adhesive mixture.

As indicated above, the amount of chelator/iron mixture that is adhered to the dried tea may be adjusted depending on the amount of added iron that is to be delivered per serving of tea preparation. For example, the chelator/iron mixture may be adhered to the dried tea in amounts of from about 0.1 mg iron/g dried tea to about 20 mg iron/g dried tea, or from about 0.5 mg iron/g dried tea to about 10 mg iron/g dried tea.

Once the chelator/iron mixture, which may be optionally microencapsulated, is adhered to the dried tea, the treated tea may then be further dried to remove residual moisture that may remain from the adhesion process. Drying may be achieved by air drying or by heating the treated tea in appropriate commercial drying equipment, such as a tray drier or drum drier.

Once dried, the iron-fortified tea preparation may be packaged for use.

As indicated above, the iron-fortified tea preparation is useful for brewing a tea beverage. When consumed on a daily basis, the iron-fortified tea preparation may provide from 1-10 mg of iron per serving of brewed tea, and thus can be a useful, inexpensive and simple method of providing supplemental iron to a person's daily diet.

As well, if desired, the iron-fortified tea preparation may be mixed together with untreated dried tea to form a mixed tea preparation, in order to further adjust the amount of added iron that is provided by a cup of brewed tea beverage using the mixed tea preparation. Untreated dried tea, as used herein, refers to tea in dried form as described above, to which no chelator/iron mixture has been adhered. The untreated dried tea, which is free from adhered chelator/iron mixture, may be the same type or form as the dried tea used in the iron-fortified tea preparation, or may be a different type or form of tea. For example, the iron-fortified tea preparation may combined with untreated dried tea at a ratio of about 1:1 to about 1:20 of iron-fortified tea preparation: untreated dried tea (by weight).

As well, the iron-fortified tea preparation may be included as an ingredient in a food product, in place of unfortified tea. Thus, brewed tea made from the iron-fortified tea preparation may form a liquid ingredient, or the dried iron-fortified tea preparation may be used as dry ingredient in a food product such as a baked good. If desired, the dried iron-fortified tea preparation may be powdered in order to include as a dry ingredient in a food product.

Thus, there is also contemplated an iron-fortified tea beverage that comprises a chelator/iron mixture having a chelator:iron molar ratio in the mixture of about 2:1 or greater.

The tea beverage may be any beverage prepared using tea, including hot brewed tea or iced tea beverages, or other beverages in which tea, tea extract or brewed tea may be an ingredient.

The tea beverage may be prepared using the iron-fortified tea preparation as described herein. As well, the tea beverage may be prepared by adding a chelator/iron mixture to the beverage, either during preparation or once the beverage has been prepared, prior to consumption.

The chelator/iron mixture is as described herein, and has a chelator:iron molar ratio of about 2:1 or greater, as described. In some embodiments, if iron EDTA (i.e. ferric EDTA) is used, additional EDTA is added to bring the molar ratio of EDTA to about 2 moles per mole of iron, as described herein.

The amount of the mixture included in the tea beverage may vary. For example, the mixture may be included in the beverage at a concentration designed to deliver from about 0.1 mg iron to about 20 mg iron per serving of tea beverage, from about 1 mg iron to about 10 mg iron per serving of tea beverage, or from about 2 mg iron to about 5 mg iron per serving of tea beverage. In some embodiments, consumption of two servings of tea beverage per day comprising the chelator/iron mixture, may provide from about 1 mg to about 20 mg or about 2 mg to about 10 mg of iron per day.

The present compositions, products, methods and uses are further exemplified by way of the following non-limiting examples.

EXAMPLES

Example 1

Use of Ferric EDTA as a Competing Complex in a Fortified Tea Preparation

Briefly, iron and sodium EDTA were attached onto tea leaves by spraying in a solution of HPMC comprising the iron and sodium EDTA. The mixed fortified tea preparation contained 2 mg iron/g tea leaves, which could provide 30% of the Recommended Daily Intake (RDI) of iron in two cups of tea. Iron content was measured by atomic absorption spectroscopy (AAS) and the iron-polyphenol complex was measured by spectrophotometry at 560 nm. Sensory evaluation was carried out in order to determine if fortification affects the properties of tea leaves and brewed tea Finally, the in vitro bioavailability of successful samples was assessed by simulation of digestion in the stomach and intestine and simulation of absorption using Caco-2 cells.

Materials and Methods

Materials:

Behora (Assam, Golaghat, India) black tea leaves were used for all experiments. Hydroxypropylmethylcellulose (HPMC) used as adhesive was kindly donated by The Dow Chemical Company (Michigan, USA). Ferric EDTA was purchased from Bio Basic (Ontario, Canada), EDTA disodium salt was obtained from BioShop (Ontario, Canada) and ferrous sulphate from Fisher Scientific (Ontario, Canada).

Fortified Tea Preparation:

The target iron content for fortified tea was about 5 mg iron/cup, which can supply the 30% of the RDI when 2 cups of fortified tea are consumed daily. The fortification procedure was carried out by preparing a premixed iron-fortified tea preparation containing 10 mg iron per gram of tea leaves, using either ferric EDTA or ferrous sulphate as iron source and with the addition of different molar ratios of total EDTA:iron (1:1, 1:1.5, 1:1.75 and 1:2) to determine the minimum ratio able to avoid the reaction. Iron compounds and EDTA were mixed together and then attached to tea leaves by spraying the mixture in a solution containing pharmaceutical grade HPMC (10% of total solids). Tea leaves were dried in a freeze dryer for 24 h.

The mixed fortified tea was prepared by mixing 10 g of premixed iron-fortified tea preparation as described above with 40 g of untreated tea leaves, which gives a final iron concentration of 2 mg iron/g of fortified tea in the final mixed tea preparation. Each cup of brewed tea was prepared from 2.5 g of tea leaves.

Iron Content in Premixed Iron Fortified Tea Preparation, Mixed Fortified Tea and Brewed Tea:

In order to evaluate if the iron compounds can be attached to tea leaves, the amount of iron in the premixed iron-fortified tea preparation and the mixed fortified tea was determined using AAS. Briefly, samples were digested with 25 ml of sulfuric acid and 2.5 ml of nitric acid for 90 minutes. Samples were then cooled to room temperature and diluted to 250 ml with distilled water. The extracts were analysed for iron content using AAS. A calibration curve from 0 to 20 ppm was prepared in a 2M aqueous solution of sulfuric acid. Iron content in brewed tea was measured directly using a calibration curve prepared in water.

Iron Polyphenol Complex:

Iron polyphenol complex was measured using spectrophotometry. 2 L of tea were freshly prepared and brewed for 5 minutes. Tea leaves were removed and the liquid was distributed into 6 beakers (250 ml each). A stock solution of ferric EDTA was prepared and increasing volumes were added to each beaker. The maximum UV and Visible light absorbance wavelength for the tea was determined Absorbance at this maximum absorbance wavelength was measured after 5, 20 and 60 minutes.

Sensory Analysis:

The visual impact of iron fortification in the colour and appearance of tea leaves was evaluated by 8 panelists.

A Flash Profile test was carried out as it allows a rapid positioning of products according to their major sensory differences. Selected discriminating attributes were natural colour, clear appearance, presence of off-flavours and natural flavour. Each attribute was evaluated on a 0 to 9 scale, where 0 means no perception of the attribute and 9 intense perception of the attribute. This test can give us the sensory map of each sample so that it can be compared with the corresponding to natural tea. The sample with the most similar profile to natural tea was then used for a triangular test in order to determine if the panelist could detect any differences between the fortified and control tea beverages.

Each of the 8 panelists received a set of three samples, from which two were the same and one was different. Each set was organized to have unfortified brewed tea and fortified brewed tea. The panelists were asked to select the sample that is different from the other ones. The level of significance was determined using statistical tables designed for triangular tests.

In Vitro Bioavailability:

Tea was prepared by brewing 2.5 g of mixed fortified tea leaves in 250 g of boiling water.

The bioaccessibility was estimated by digesting 100 ml of brewed tea at pH 1 and 4 ml of 4% pepsin solution for 2 h at 37° C. In order to stop the reaction, the sample was cooled down in an ice bath for 10 minutes. To simulate intestinal digestion, the pH was increased to 6.5 and pancreatin/bile salt solution was added and agitated for 2 h at 37° C. The liquid was centrifuged and the supernatant was filtered using a 0.45 um syringe filter. The final iron content was measured using AAS and the bioaccessible portion was reported as the amount of added iron remaining in the liquid after the digestion process.

The resulting liquid was used to assess the transport through Caco-2 cells using a Caco-2 Assay kit in a ready-to-use cell-based assay format. After 2 h of incubation at 37° C., the decrease in the concentration of iron in the apical side of the monolayer was measured.

Results

A ratio of 2:1 EDTA:iron was able to avoid iron/polyphenol complex formation and provide 4 mg of iron per cup of brewed tea.

Sensory evaluation showed that brewed fortified tea (ratio 2:1) had a similar profile to natural tea and the untrained panelists were unable to identify which the fortified sample. However, fortified tea with a ratio lower than 2:1 of EDTA:iron had a darker colour and off-flavours.

In vitro bioavailability tests suggest that iron added at an EDTA:iron molar ratio 2:1 is equally bioavailable in water and in tea.

By the addition of EDTA in a molar ratio 2:1 to the iron, it was possible to produce an iron-fortified tea without the formation of off-flavours and colours through interaction with tea polyphenols.

Example 2

This experiment relates to microencapsulation of the iron-EDTA mixture prior to adhesion onto the tea leaves. Microencapsulation is performed prior to adhesion to the dried tea. That is, microcapsules were formed as described below, suspended in adhesive solution and then sprayed onto the dried tea leaves in order to adhere the microencapsulated iron-EDTA mixture on the tea.

Ferric sodium EDTA and EDTA were dissolved in water in a 1:1 molar ratio. Eudragit was added to the solution, which was then sprayed out using a Buchi model spray drier at inlet temperature of 175° C. The resulting microcapsules were collected and analysed for iron content, and examined using scanning electron microscope for coating integrity, prior to adhesion to the dried tea.

Example 3

This experiment relates to attachment of iron to tea leaves using an adhesive, experiments using ferric EDTA: Iron content in tea leaves and brewed tea and evaluation of complex formation in brewed tea, use of other iron sources, assessing the bioaccessibility and bioavailability of iron in fortified tea, and sensory evaluation of the fortified tea.

Attachment of Iron onto Tea Leaves:

Iron fortification of tea leaves was carried out by preparing a premix, with a concentration of 10 mg of iron per gram of tea leaves, which were then mixed with untreated tea leaves to a final concentration of 2 mg/g of fortified tea. The premix was prepared by spraying an iron containing solution into tea leaves in a pan coater. The solution contained the iron source and 1% of a cellulosic adhesive (HPMC, HPC and CMC). Table 1 shows the adhesion of iron when using different cellulosic materials.

TABLE 1

Iron adhesion when using different adhesives.

| Cellulosic material | Iron content premix (target 10 mg/g) | Fortified tea (target 2 mg/g) |
|---|---|---|
| HPMC | 8.8 ± 0.3 | 1.8 ± 0.1 |
| HPC | 9.2 ± 0.2 | 1.9 ± 0.1 |
| CMC | 9.1 ± 0.3 | 1.8 ± 0.2 |

Preliminary Experiments Using Ferric EDTA:

Ferric EDTA was added into brewed tea at a concentration of 5 mg iron/250 ml of tea. The complex was formed at tea pH, with tea becoming darker, indicating that the complex was developed (FIG. 1).

Previously, Fe(III)-EDTA was tested as a sugar fortificant, resulting in a pale yellow fortified sugar. However, the addition of fortified sugar to tea resulted in an immediate marked colour change, tuning into deep blue (Cook & Reusser, 1983; Viteri et al., 1995). In order to test the effectiveness of EDTA to avoid complex formation, increasing molar ratios of EDTA were added to iron. Iron:EDTA molar ratios varied from 1:0 to 1:2.5 using ferric EDTA as iron source (molar ratio 1:0 was just ferrous sulphate, 1:1 molar ratio was ferric sodium EDTA, and higher molar ratios were prepared adding sodium EDTA). Attachment of iron compounds was carried out using Pharmaceutical grade HPMC. Table 2 shows the iron content in tea leaves and brewed tea when adding different iron:EDTA ratios into tea leaves.

TABLE 2

Iron content in tea leaves and brewed tea when adding different iron:EDTA ratios into tea leaves.

| Fe:EDTA ratio | Iron content in premix (mg/g) | Iron content in fortified tea (mg/g) | Iron content in brewed tea (mg/cup) |
|---|---|---|---|
| 1:0 (FeSO$_4$) | 9.1 ± 0.2 | 1.9 ± 0.2 | 4.5 ± 0.2 |
| 1:1 | 9.1 ± 0.2 | 1.8 ± 0.1 | 4.5 ± 0.1 |
| 1:1.5 | 8.9 ± 0.3 | 1.8 ± 0.2 | 4.4 ± 0.1 |
| 1:1.75 | 8.9 ± 0.2 | 1.8 ± 0.2 | 4.4 ± 0.2 |
| 1:2 | 8.5 ± 0.2 | 1.7 ± 0.1 | 4.2 ± 0.1 |

Complex formation was determined using spectrophotometry. A calibration curve was prepared using ferric sodium EDTA and tea polyphenols. The maximum UV and visible light wavelength absorbance for the iron-tea polyphenol complex was determined. The maximum absorbance was 580 nm at tea pH and fortified teas were measured after 5, 20 and 60 minutes.

Table 3 shows the iron content and iron forming the complex with polyphenols in brewed teas. Complex formation decreases when increasing the Fe:EDTA ratio and increases with time. Regarding, molar ratio, when using a molar ratio 1:0 (ferrous sulphate), more than 90% of added iron was complexed with polyphenols. The utilization of EDTA for protecting added iron resulted in a complexation of 72% of added iron. Increasing the Fe:EDTA ratio decreased the amount of iron forming the complex to 2% of added iron forming complex when the molar ratio was 1:2. Further increase in Fe:EDTA molar ratio, did not provide a significant reduction in complex formation. The optimum Fe:EDTA ratio for avoiding complex formation appears to be 1:2; this ratio was then used to evaluate the bioaccessibility and bioavailability of iron and for sensory evaluation. Other iron sources, using the optimum ratio, were evaluated such as ferrous sulphate and ferrous fumarate as alternatives to the expensive ferric sodium EDTA.

TABLE 3

Polyphenol complex formation when using different Fe:EDTA molar ratios.

| Time (min) | Iron (mg/cup) in polyphenol complex at different Iron:EDTA ratio | | | | | |
|---|---|---|---|---|---|---|
| | 1:0 | 1:1 | 1:1.5 | 1:1.75 | 1:2 | 1:2.5 |
| 5 | 3.8 ± 0.3 | 3.1 ± 0.1 | 2.1 ± 0.2 | 2.1 ± 0.2 | 0.1 ± 0.0 | 0.0 ± 0.1 |
| 20 | 4.0 ± 0.2 | 3.2 ± 0.2 | 2.2 ± 0.3 | 2.3 ± 0.1 | 0.1 ± 0.1 | 0.1 ± 0.0 |
| 60 | 4.1 ± 0.1 | 3.2 ± 0.1 | 2.3 ± 0.2 | 2.3 ± 0.3 | 0.1 ± 0.0 | 0.0 ± 0.1 |

Figure 2:
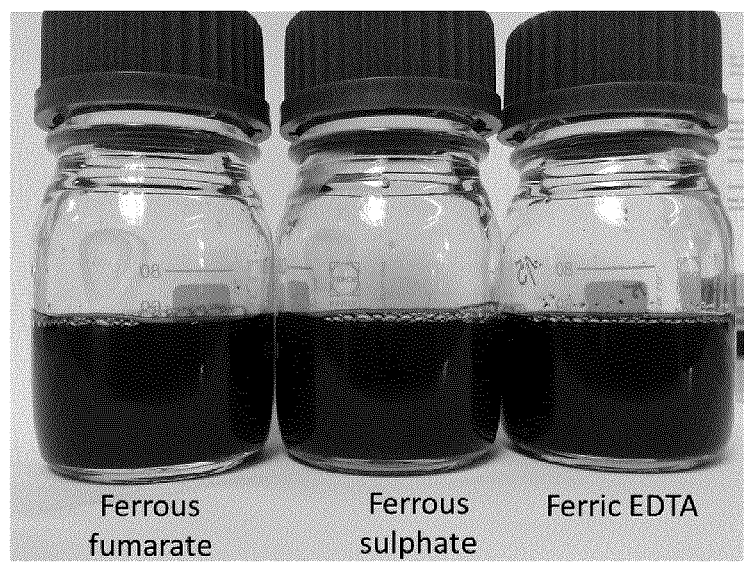
FIG. 2 is photographs showing the coloured complex formation when adding ferrous fumarate (left), ferrous sulphate (middle), and ferric EDTA (right) to tea without EDTA protection.
Figure 3:
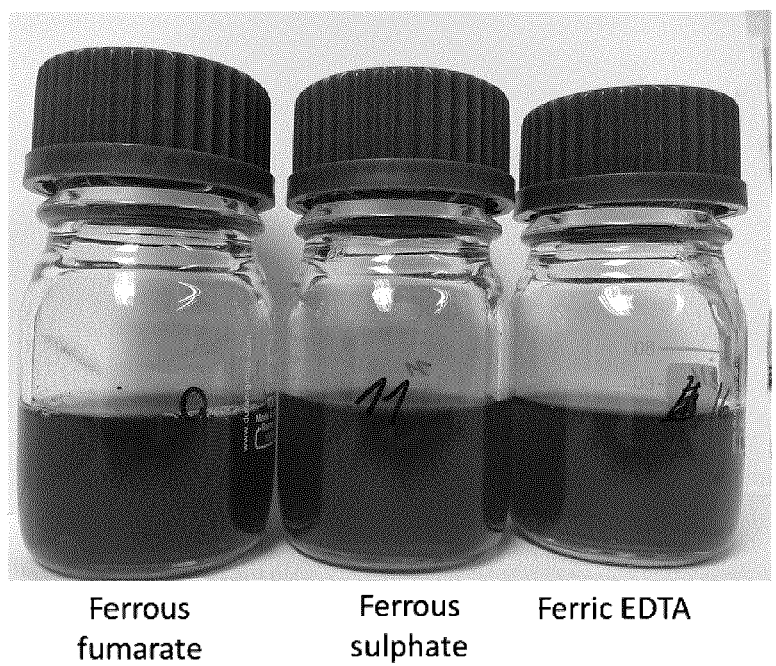
FIG. 3 is photographs of light coloured brewed tea showing no complex formation when adding iron sources with 2:1 molar ratio of EDTA:iron.

Use of Other Iron Sources:

Other iron sources were tested as potential iron fortificants for tea. Selected iron sources were ferrous fumarate and ferrous sulphate. When adding the iron compounds directly into tea, without EDTA protection, iron-polyphenol complex was formed instantaneously (FIG. 2). EDTA protection in a molar ratio 1:2 was effective in avoiding complex formation when using ferric EDTA, ferrous fumarate or ferrous sulphate as iron sources (FIG. 3).

Bioaccessibility and Bioavailability of Iron in Fortified Tea:

The bioaccessibility and bioavailability of fortified tea was evaluated for the following 7 samples: (1) ferric EDTA/EDTA in water; (2) ferric EDTA/EDTA in tea; (3) ferrous fumarate/EDTA in tea; (4) ferrous sulphate/EDTA in tea; (5) ferric EDTA in tea; (6) ferrous fumarate in tea; and (7) ferrous sulphate in tea. Unfortified tea was used as a control. Comparison of samples 2, 3 and 4 allowed for determination of the effect of the iron source; comparison of samples 2 and 5, 3 and 6 and 4 and 7 allowed for determination of the effect of EDTA addition; and comparison of samples 1 and 2 allowed for determination of the effect of the tea.

Tea was prepared by brewing 5 g of fortified tea leaves in 100 g of boiling water. The iron content in the brew was measured using AAS. The bioaccessibility was estimated by digesting 50 g of brewed tea at pH 2 (adjusted using 1M HCl) and presence of 4 ml of pepsin solution (0.04 g/ml) for 2 h at 37° C. and continuous shacking. In order to stop the reaction, the sample was cooled down in an ice bath for 10 minutes. To simulate gut digestion, the pH was increased to 6.5 using 1M Na$_2$CO$_3$ and presence of 5 ml of pancreatin (0.005 g/ml) and bile salts (0.03 g/ml) solution for 2 h at 37° C. and continuous shacking. The liquid was centrifuged at 6000 rpm for 15 min and the supernatant was filtered using a 0.45 um syringe filter. The final iron content was measured using AAS and the reported value is the amount of added iron remaining in the liquid after the digestion process (bioaccessible fraction).

The resulting liquid was used to assess the transport and absorption through Caco-2 cells. Caco-2 cells were grown and allowed to differentiate in monolayers using a 6-well Corning™ 3412 Transwell Inserts and experiments were carried out on day 21 after seeding. The digested liquid was diluted to half with buffer in order to ensure cells survival during the experiment, and the basolateral camera was filled with 2 ml of buffer. The transport experiments were carried out in an incubator at 37° C. for 2 h. Using a micropipette, the liquid from the apical and basolateral cameras was collected and frozen for analysis. The concentration of iron in the basolateral camera was measured in order to estimate iron bioavailability (bioavailable fraction).

Figure 4:
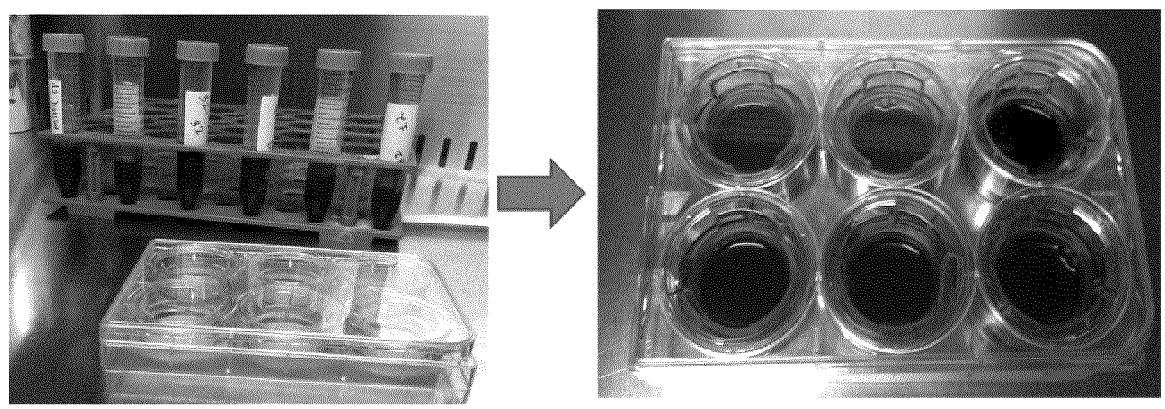
FIG. 4 is photographs showing transport experiments using Caco-2 cells.

FIG. 4 shows the transport procedure carried out in the lab using the Caco-2 cells. The liquid from the basolateral camera was collected and sent for iron analysis using AAS.

Figure 5:
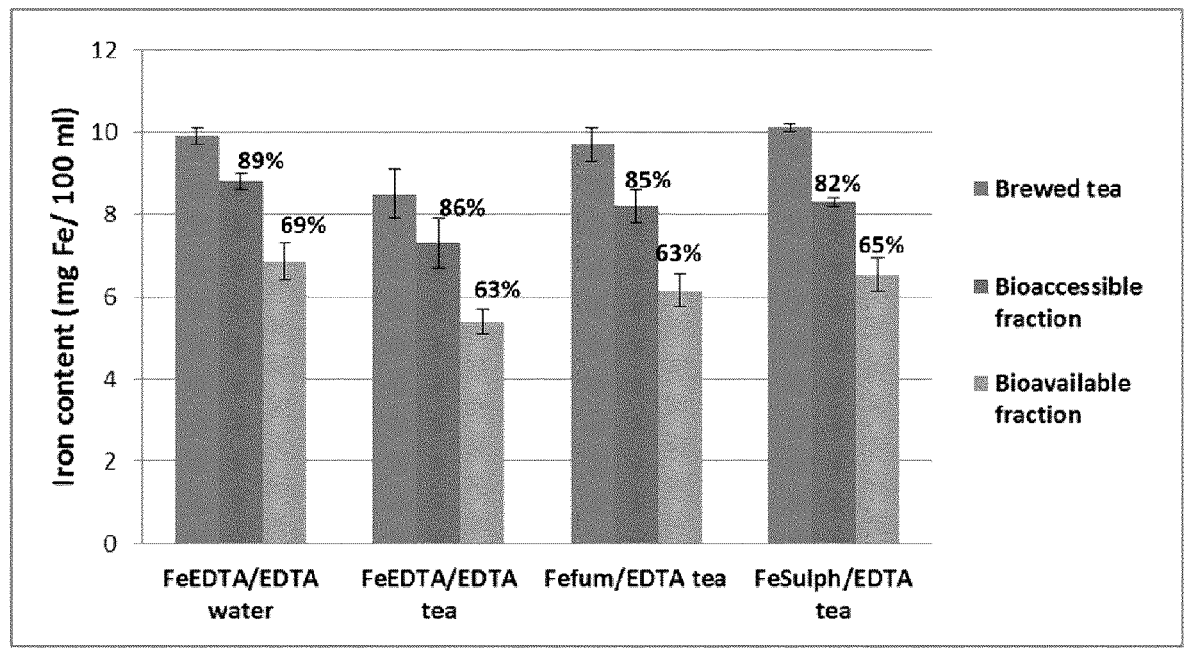
FIG. 5 is a graph depicting iron content in brewed tea, bioaccessible and bioavailable fractions of tea fortified with iron from different sources added with EDTA protection.

FIG. 5 shows the iron content in brewed tea (or water), bioaccessibility and bioavailability after in vitro digestion and Caco-2 cells transport for tea fortified with iron from different sources, added with EDTA protection. The results show that the effect of tea polyphenols in the bioaccessibility can be avoided by adding iron along with EDTA as a protective agent as the bioaccessibility of FeEDTA/EDTA in tea was similar to that of water (86% compared to 89%). Iron source has a minimal effect in iron bioaccessibility in fortified tea, with ferric EDTA presenting the highest; however, it was not significant. Bioavailability was slightly higher for FeEDTA/EDTA in water than in tea. Among different iron sources, the highest bioavailability (as % of iron in brewed tea) was observed for ferrous sulphate. Overall, bioavailability of iron-fortified tea was around 65% for all iron sources in the presence of EDTA.

Figure 6:
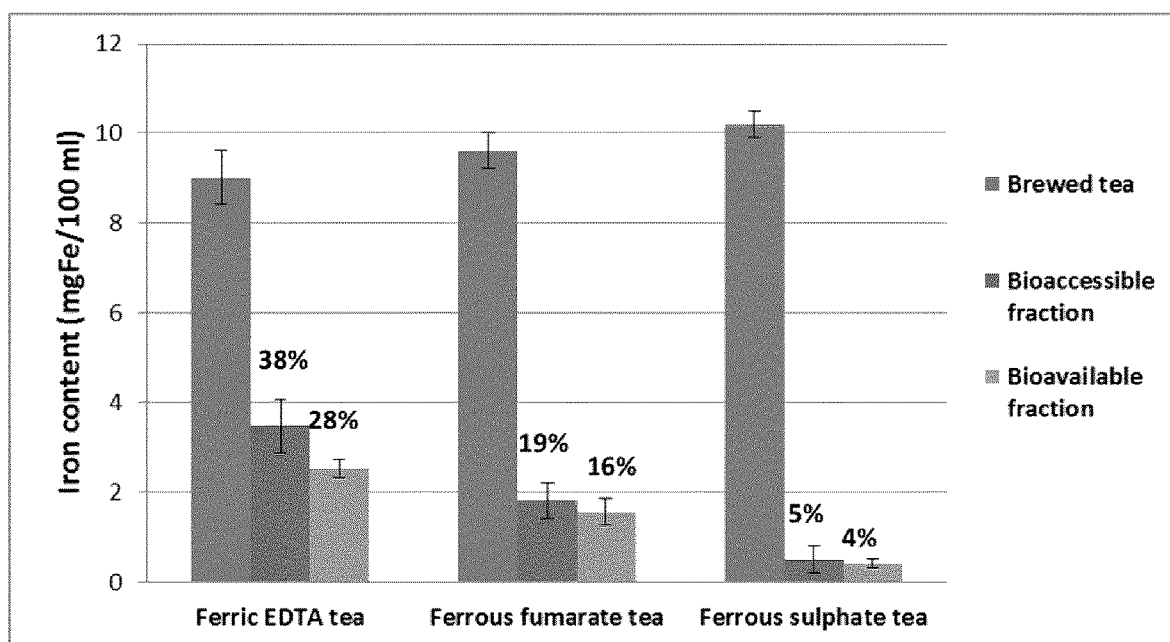
FIG. 6 is a graph depicting iron content in brewed tea, bioaccessible and bioavailable fractions of tea fortified with iron from different sources.

FIG. 6 shows the iron content in brewed tea, bioaccessibility and bioavailability after in vitro digestion and Caco-2 cells transport for tea fortified with iron from different sources added into tea with no protection. As it can be observed, iron bioaccessibility is lower than when added along with EDTA. Ferrous sulphate presented the lowest bioaccessibility, followed by ferrous fumarate and ferric EDTA. These results suggest that digestive enzymes are not able to digest the iron-polyphenol complex.

Bioavailability of iron when added without EDTA protection was 28%, 16% and 4% for ferric EDTA, ferrous fumarate and ferrous sulphate, respectively. These results suggest that the inhibition of iron uptake in the presence of tea polyphenols starts by limiting the accessibility of digestive enzymes.

When comparing results obtained from FIG. 4 and FIG. 5, in the presence of EDTA, bioavailability appears to be considerably lower than bioaccessibility, which does not occur when the iron source is added on its own. This suggests that there might be an effect of EDTA at the border of the Caco-2 cell. It has previously been suggested that uptake of iron from NaFeEDTA by intestinal enterocytes is regulated by the dissociation of iron from EDTA and its reduction, just as simple inorganic iron sources do at the brush border membrane of the enterocyte in order to be absorbed. Nonetheless, iron added along with EDTA in fortified tea was significantly more bioavailable than when added with no protection, representing a 2.25-fold, 4-fold and 16-fold increased bioavailability when adding ferric EDTA, ferrous sumarate and ferrous sulphate with an excess of EDTA, respectively.

Figure 7:
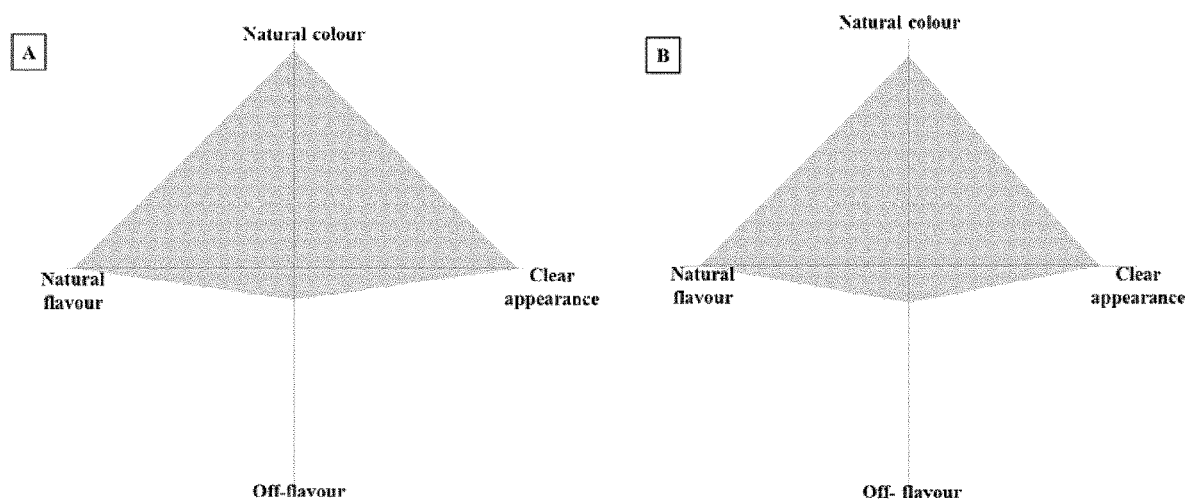
FIG. 7 is a sensory map of tea and fortified tea prepared using ferric EDTA as iron source (A) Natural tea, (B) fortified tea with a 2:1 EDTA:iron ratio.

Sensory Evaluation:

Apart from being bioavailable, fortified tea has to be pleasant for the consumer and have minimum variations to the natural brewed tea. In order to assess the acceptance of fortified tea, a Flash Profile test was carried out as it allows a rapid positioning of products according to their major sensory differences. Selected discriminating attributes were natural colour, clear appearance, presence of off-flavours and natural flavour. Each attribute was evaluated on a 0 to 9 scale, where 0 means no perception of the attribute and 9 intense perception of the attribute. This test can give us the sensory map of fortified tea so that it can be compared with the corresponding to natural tea. FIG. 7 shows the sensory maps of brewed tea and fortified tea prepared using a Fe:EDTA ratio of 1:2 and ferric EDTA as iron source. Fortified tea showed a very similar sensory map to natural tea, showing that the fortification procedure was able to avoid colour development and off-flavours due to the formation of iron-polyphenol complex.

CONCLUSIONS

Based on the results of the above experiments, it appears that cellulosic materials are useful adhesive materials for attaching iron formulas onto tea leaves.

As well, tea polyphenols were shown to be potent iron chelators and form a complex that darkens the tea and reduces the bioaccessibility of iron. This polyphenol complex formation can be reduced by adding EDTA as chemical protection for iron. The optimum molar ratio (iron:EDTA) able to avoid complex formation appears to be 1:2.

It was also found that for tea fortification using EDTA as protection, it is possible to use other cheaper iron sources such as ferrous fumarate and ferrous sulphate, as such iron sources do not promote colour changes and have a similar bioaccessibility as when using ferric EDTA as iron source.

The in vitro bioaccessibility test results suggest that this approach for adding iron into tea is equally bioaccessible in water and in tea.

In vitro bioavailability results suggest that when adding iron along with a molar excess of EDTA there is a limiting stage that may reduce bioavailability. However, bioavailability of iron in tea was higher than 63% for all iron sources. Bioavailability of iron when added without further reduction was 34%, 12% and 4% for ferric EDTA, ferrous fumarate and ferrous sulphate, respectively.

Thus, it appears that competitive complexation of iron with EDTA (at a 2:1 molar ratio of EDTA:iron) avoids the formation of the iron-polyphenol complex. From these results, this polyphenol/iron complex appears not to be digestible by enzymes, as bioaccessibility was highly reduced when adding iron without EDTA protection.

Example 4

In Vivo Effects of Iron Fortification of Tea Caco-2 Based on In Vitro Cell Model This example includes the analysis of iron bioaccessibility and bioavailability in fortified tea, using different iron sources (ferrous sulphate, ferrous fumarate and ferric EDTA), added either as pure compounds or together with a molar excess (1:2) of EDTA.

Bioaccessibility and Bioavailability of Iron in Fortified Tea:

The bioaccessibility and bioavailability of fortified tea was evaluated for the following 13 samples: ferrous sulphate in tea; ferrous sulphate in water; ferrous sulphate/EDTA in water; ferrous sulphate/EDTA in tea; ferrous fumarate in water; ferrous fumarate in tea; ferrous fumarate/EDTA in water; ferrous fumarate/EDTA in tea; ferric EDTA in water; ferric EDTA in tea; ferric EDTA/EDTA in water; ferric EDTA/EDTA in tea; and tea (control).

Tea was prepared by brewing 5 g of fortified tea leaves in 100 g of boiling water. Fortification was carried out by adding 10 mg of iron with or without the addition of EDTA into the brew. For water samples, the same procedure was followed without tea leaves addition. The iron content in the brew was measured using Atomic Absorption Spectrophotometry (AAS).

The bioaccessibility was estimated by digesting 50 g of brewed tea at pH1 (adjusted using 1M HCl) and presence of 4 ml of pepsin solution (0.04 g/ml) for 2 h at 37° C. and continuous shaking. In order to stop the reaction, the sample was cooled down in an ice bath for 10 minutes. To simulate gut digestion, the pH was increased to 6.5 using 1M $Na_2CO_3$ and presence of 5 ml of pancreatin (0.005 g/ml) and bile salts (0.03 g/ml) solution for 2 h at 37° C. and continuous shacking. The liquid was centrifuged at 6000 rpm for 15 min and the supernatant was filtered using a 0.45 μm syringe filter. The final iron content was measured using AAS and the reported value is the amount of added iron remaining in the liquid after the digestion process (bioaccessible fraction).

Figure 8:
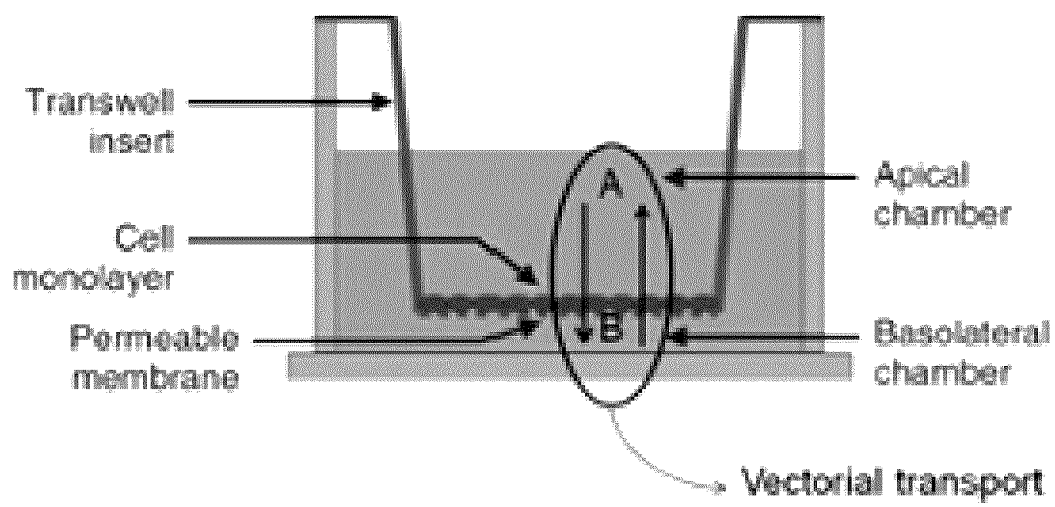
FIG. 8 is a schematic diagram of the insert well configuration used for Caco-2 cell experiments.

The resulting liquid was used to assess the transport and absorption through Caco-2 cells. Caco-2 cells were grown and allowed to differentiate in monolayers using a 6-well Corning™ 3412 Transwell Inserts and experiments were carried out 21 days after seeding. The transepithelial electrical resistance (TEER) across the cell monolayer was measured in order to ensure its integrity. The basolateral chamber (FIG. 8) of each insert was filled with 2 ml of HBSS buffer, and the apical camera filled with 2 ml of the bioacessible liquid. The transport experiments were carried out in an incubator at 37° C. for 2 h. Using a micropipette, the liquid from the apical and basolateral cameras was collected and frozen for analysis. The concentration of iron in the basolateral camera was measured in order to estimate iron bioavailability (bioavailable fraction).

Figure 9:
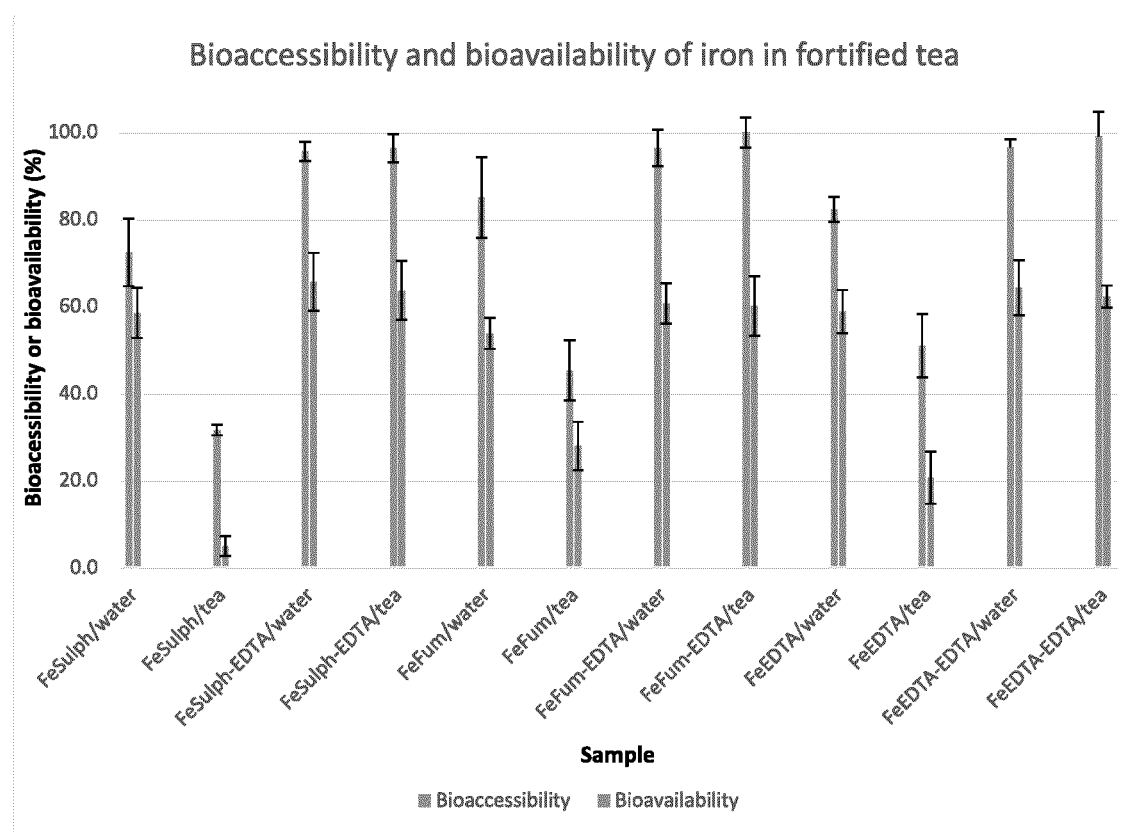
FIG. 9 is a graph depicting the bioaccessiblity and bioavailability of iron in tea and water, with or without EDTA addition.

FIG. 9 shows the bioaccessibility and bioavailability after in vitro digestion and Caco-2 cell transport for tea fortified with iron from different sources, with or without EDTA protection. The results show that the effect of tea polyphenols can be blocked when adding iron with EDTA in a 1:2 molar ratio, as the bioavailability of all iron sources is similar in water and in tea for this ratio of iron:EDTA. As well, the results indicate that the particular iron source has a minimal effect in iron bioaccessibility and bioavailability in fortified tea, as there are no significant differences between iron bioavailability for the different sources. Iron bioaccessibility and bioavailability was significantly lower when iron was added without EDTA protection, with the lowest result being obtained for ferrous sulphate. These results suggest that digestive enzymes are not capable of digesting the iron-polyphenol complex, suggesting that the inhibition of iron uptake in the presence of tea polyphenols starts by limiting the accessibility of digestive enzymes. As well, the bioavailability of iron in the presence of EDTA was significantly higher than without EDTA.

Example 5

Gallic Acid as a Model Compound for Iron Complexation

Tea polyphenols contain gallol and catechol groups that are responsible for binding iron. Because gallic acid binds iron similarly to tea polyphenols and is a simple, well-studied compound it was selected to model tea.

To approximate brewed tea, a concentration of 1 g/L and pH 5 were used. Binding of iron was also tested at pH 7 to approximate the pH of the small intestine. Hydrochloric acid and sodium hydroxide were used to adjust and maintain the pH. Three iron sources were added to the gallic acid solutions to a final concentration of 0.3 mM: ferrous sulfate (FS), ferrous fumarate (FF), and ferric sodium EDTA (FeNaEDTA). Since the iron-gallate complex is coloured, spectrophotometry was used to quantify the complex formation. The peaks were at wavelengths of 550 at pH 5 and 565 at pH 7. The results may be seen in Table 4. The use of ferric sodium EDTA, which contains a 1:1 iron:EDTA molar ratio reduced the amount of iron polyphenol complex formation by 94%±3% at pH 5 and 93%±2% at pH 7.

TABLE 4

Complexation of Iron in Gallic Acid

| Target pH | Iron Source | Measured pH | Iron gallic acid complex (%) |
|---|---|---|---|
| 5 | Ferrous sulphate | 4.96 ± 0.00 | 100 ± 3.0 |
|   | Ferrous fumarate | 4.98 ± 0.02 | 103 ± 3.0 |
|   | FeNaEDTA | 4.91 ± 0.01 | 6.2 ± 0.2 |
| 7 | Ferrous sulphate | 6.92 ± 0.00 | 100 ± 2.0 |
|   | Ferrous fumarate | 6.87 ± 0.05 | 110 ± 2.0 |
|   | FeNaEDTA | 6.95 ± 0.02 | 7.0 ± 0.5 |

Example 6

Complexation of Iron with Polyphenols in Tea Extract

In a first experiment, three iron sources (ferrous sulfate (FS), ferrous fumarate (FF), and ferric sodium EDTA (FeNaEDTA)) at 0.3 mM were compared based on the amount of coloured iron complex formation in tea extract at both pH 5 and pH 7.

The tea extract was prepared using a solution of 50% by volume N,N-dimethylformamide (DMF) and 50% by volume reverse osmosis purified (RO) water with black tea leaves. This extract contained approximately 15-20 g of gallic acid equivalents (GAE)/L of phenolic compounds. Tea extract was diluted to the concentration of tea (1 gGAE/L) or to $\frac{1}{10}^{th}$ of that concentration (0.1 gGAE/L) for use in these experiments and pH was controlled using hydrochloric acid and sodium hydroxide.

Iron complex formation was measured using spectrophotometry and analyzed by normalizing against ferrous sulfate in gallic acid (GA) at the phenolic concentration of tea. Therefore, 100% represents the peak absorbance of ferrous sulfate in a 1 g/L gallic acid solution at pH 5 or pH 7. When tea extract is tested at the typical polyphenol concentration of tea (1 gGAE/L) using ferrous sulfate or ferrous fumarate, precipitation occurs and thus is not measureable by spectrophotometry. Due to this, tea extract at a concentration of 0.1 gGAE/L was tested as well. The results are summarized in Table 5.

Ferric sodium EDTA, which contains iron and EDTA in a 1:1 molar ratio, allowed iron to form much less complex with polyphenols than the other two forms of iron in most cases. For 0.1 gGAE/L tea extract only 3% of the complex formed at both pH 5 and pH 7. In tea extract at the expected concentration of tea, 1 gGAE/L, ferric sodium EDTA was the only iron source to not cause precipitation. Also, there is a decrease in iron-polyphenol complex formation at both pH 5 and pH 7 but it is much more pronounced at pH 5, where complex formation is reduced by 96% in comparison to only 30% at pH 7.

TABLE 5

Complexation of Iron in Tea Extract

| Target pH | Tea Extract Concentration | Iron Source | Actual pH | Wavelength of Peak Absorbance | Iron Complex (% FS in 1 g/L GA) |
|---|---|---|---|---|---|
| 5 | 1 gGAE/L | FeNaEDTA | 5.00 ± 0.01 | no peak *(570) | 4 ± 6 |
|   | 0.1 gGAE/L | FS | 5.01 ± 0.03 | 570 | 72 ± 2 |
|   |   | FF | 5.11 ± 0.05 | 570 | 65 ± 2 |
|   |   | FeNaEDTA | 5.02 ± 0.03 | no peak *(570) | 3.0 ± 0.2 |
| 7 | 1 gGAE/L | FeNaEDTA | 7.03 ± 0.02 | 540 | 70 ± 8 |
|   | 0.1 gGAE/L | FS | 6.87 ± 0.02 | 565 | 85 ± 1 |
|   |   | FF | 6.86 ± 0.01 | 565 | 66 ± 3 |
|   |   | FeNaEDTA | 6.94 ± 0.02 | 555 | 3.0 ± 0.7 |

*Measurement taken at the same wavelength as other iron sources at the same pH.

In a second experiment, ferrous sulfate (FS) was added to tea extract with varying amounts of disodium EDTA to determine the effect of EDTA on iron-polyphenol complex formation.

The compositions of these solutions were such that the final concentration of iron was 0.3 mM, the concentration of polyphenols was 0.1 gGAE/L, and the pH was 5 (the pH of brewed tea) or pH 7 (an approximation of small intestinal pH). The pH was adjusted and maintained using hydrochloric acid and/or sodium hydroxide.

The tea extract was prepared using a solution of 50% by volume N,N-dimethylformamide (DMF) and 50% by volume reverse osmosis purified (RO) water with black tea leaves. This concentrated extract contained approximately 15-20 g of gallic acid equivalents (GAE)/L of phenolic compounds. Iron complex formation was measured using spectrophotometry, zeroed with plain tea extract, and analyzed by normalizing against the ferrous sulfate solutions. Therefore, 100% represents the peak absorbance of ferrous sulfate in tea extract at pH 5 or pH 7 without the addition of disodium EDTA.

The results may be seen in Table 6. These results demonstrate a large decrease in complex formation when the iron:EDTA molar ratio is 1:1 (85%-95%) and a further decrease when the iron:EDTA ratio is 1:2 (95%-98.4%).

TABLE 6

Complexation of Iron with Polyphenols in Tea Extract with Added EDTA

| Molar Ratio Iron:EDTA | pH | Iron-Polyphenol Complex Formation (% FS in Tea Extract) |
|---|---|---|
| 1:0 | 5 | 100 ± 2 |
|   | 7 | 100 ± 2 |
| 1:1 | 5 | 5 ± 3 |
|   | 7 | 15 ± 2 |
| 1:2 | 5 | 1.6 ± 0.2 |

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Concentrations given in this specification, when given in terms of percentages and ratios, include molar ratios as well as weight/weight (w/w), weight/volume (w/v) and volume/volume (v/v) percentages and ratios.

As used in this specification and the appended claims, the singular forms "a", "an" and "the" include plural reference unless the context clearly dictates otherwise. As used in this specification and the appended claims, the terms "comprise", "comprising", "comprises" and other forms of these terms are intended in the non-limiting inclusive sense, that is, to include particular recited elements or components without excluding any other element or component. As used in this specification and the appended claims, all ranges or lists as given are intended to convey any intermediate value or range or any sublist contained therein. Unless defined otherwise all technical and scientific terms used herein have the same meaning as commonly understood to one of ordinary skill in the art to which this invention belongs.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. An iron-fortified tea preparation comprising:
    dried tea; and
    a mixture of a chelator and iron adhered to the dried tea, the molar ratio of chelator:iron in the mixture being about 2:1 or greater than 2:1, wherein the chelator is EDTA, EDDHA, or a combination thereof.

2. The tea preparation of claim 1, wherein the mixture is adhered to the dried tea with an adhesive.

3. The tea preparation of claim 2, wherein the adhesive comprises a starch, a modified starch, a dextrin, a modified dextrin, a cellulose, a modified cellulose, sucrose, a stearine or a gum.

4. The tea preparation of claim 1, wherein the mixture of the chelator and the iron is microencapsulated.

5. The tea preparation of claim 4, wherein the mixture of the chelator and the iron is microencapsulated in a reverse enteric coat, an enzyme-responsive coat, a delayed release coat, a thermally-stable enteric coat, chitosan, pectin, cylcodextrin, dextran, guar gum, inulin, amylose or locust bean gum.

6. The tea preparation of claim 1, wherein the amount of iron present in the preparation is from about 0.1 mg iron per g of dried tea to about 20 mg iron per g of dried tea.

7. A method of preparing an iron-fortified tea preparation of claim 1, the method comprising:
    combining a chelator with an iron source in a molar ratio of about 2:1 or greater than 2:1 of chelator:iron to form a mixture of chelator and iron, wherein the chelator is EDTA, EDDHA, or a combination thereof; and
    adhering the mixture of the chelator and the iron to dried tea to yield the iron-fortified tea preparation.

8. The method of claim 7, wherein the iron source comprises ferrous sulphate, ferrous gluconate, ferrous lactate, ferrous fumarate, ferrous citrate, ferrous succinate, ferric pyrophosphate, ferric orthophosphate, or iron EDTA.

9. The method of claim 7, wherein the combining comprises dissolving the chelator in a solvent and subsequently mixing in the iron source.

10. The method of claim 7, wherein the method further comprises adding an adhesive to the mixture of the chelator and the iron prior to the adhering.

11. The method of claim 10, wherein the adhesive is added at a concentration of about 0.5% (w/v) to about 25% (w/v).

12. The method of claim 10, further comprising microencapsulating the mixture of the chelator and the iron in a microencapsulating agent prior to adding the adhesive.

13. The method of claim 12, wherein the microencapsulating agent forms a reverse enteric coat, an enzyme-responsive coat, a delayed release coat or a thermally-stable enteric coat.

14. The method of claim 7, further comprising, drying the iron-fortified tea preparation following the adhering step.

15. The tea preparation of claim 1, wherein the mixture of the chelator and the iron further comprises a flavouring a colouring, a perfume, or an essential oil.

16. The tea preparation of claim 1, wherein the mixture of the chelator and the iron further comprises ascorbic acid.

17. The method of claim 7, further comprising including a flavouring a colouring, a perfume, or an essential oil in the mixture of the chelator and the iron.

18. The method of claim 7, further comprising including ascorbic acid in the mixture of the chelator and the iron.

* * * * *